United States Patent [19]

Mersing

[11] Patent Number: 4,839,959
[45] Date of Patent: Jun. 20, 1989

[54] METHOD OF FORMING A MAGNETIC HEAD

[75] Inventor: Roger L. Mersing, Mission Viejo, Calif.

[73] Assignee: Odetics, Inc., Anaheim, Calif.

[21] Appl. No.: 111,998

[22] Filed: Oct. 22, 1987

[51] Int. Cl.$^4$ .............................................. G11B 5/42
[52] U.S. Cl. ...................................... 29/603; 51/128; 51/281 R; 360/122
[58] Field of Search ................ 29/603; 360/122, 129; 51/281 R, 128

[56] References Cited

U.S. PATENT DOCUMENTS

| | | | |
|---|---|---|---|
| 3,334,446 | 8/1967 | Jager | 51/128 |
| 3,516,153 | 6/1970 | Schneider | 29/603 |
| 3,668,775 | 6/1972 | Morita et al. | 29/603 |
| 3,947,887 | 3/1976 | Platter | 29/603 X |
| 4,346,418 | 8/1982 | Cullum et al. | 29/603 X |
| 4,550,492 | 11/1985 | Lemke | 29/603 |

OTHER PUBLICATIONS pp. 500–503 of *Fluid Film Lubrication* authored by Abraham Eshel, edited by William A. Gross and published by John Wiley & Sons, Inc. in 1980.

*Primary Examiner*—Carl E. Hall
*Attorney, Agent, or Firm*—Spensley Horn Jubas & Lubitz

[57] ABSTRACT

A method of forming magnetic head having beveled surface contour wherein the contour is formed by lapping at least one guide member is coupled to the body of the magnetic head to function as a guide to control the forming of the contour during the lapping procedure.

10 Claims, 5 Drawing Sheets

METHOD OF FORMING A MAGNETIC HEAD

BACKGROUND OF THE INVENTION

1. Field of the Invention

The present invention relates to the art of forming magnetic heads for reading and writing information on magnetic recording media. More particularly, the present invention is directed to a method of forming magnetic heads having surface contour designed for reading and writing information on magnetic recording media at high speed.

2. Description of the Prior Art

In recording and playback, a magnetic medium such as magnetic tape moves past a magnetic head, which is formed of at least one electromagnet with a highly focused fringing field. For certain applications, it is desirable to record data onto a tape at a high rate. To accomplish this, the tape speed is increased with increasing data rate.

FIG. 1 shows the region of a magnetic head 10 which is contacted by a magnetic tape 12. Typically, the magnetic head has a convex curve contour at the tape contact region. Nominally, the tape comes into contact with the head at a tangent to the curved head surface as the tape passes over the head. The magnetic head 10 includes a body 13 on which a pair of magnetic pole tips 16 are attached. The tips 16 are exposed at the surface of the magnetic head 10 facing the magnetic tape 12. Between the tips 16 is a gap 18 across which a magnetic field may be created by electromagnetism of a magnetic core (not shown) which is located within the body 13 of the magnetic head 10. The thickness of the tips 16 at the gap, i.e. gap depth 20, is one of the factors which determines the service life of the head. Specifically, the magnetic tape 12 is abrasive to the tips 16. The tape rubs against the tips as the tape passes over the tips. The tips eventually wear out when the gap depth reaches zero at which time the service life of the head ends.

As the tape 12 passes over the tips 16, the tape may separate from the tips 16. Tape separation from the magnetic head arises from, among other phenomena, foil-bearing effect between the tape and the head. Such effect is caused by entrainment of air, by the boundary layer on the side of the tape facing the head, toward the head and between the tape and the head thereby creating an lifting force on the tape. It has been found that the higher the tape speed, the more profound the effect.

Tape separation from the head affects the magnetic field intensity of the tips 16 acting on the magnetic tape 12, which in turn affects the resolution of the data recorded on the tape. Generally, the loss in magnetic field intensity is directly proportional to the separation spacing between the tape and the head and inversely proportional to the wavelength of the recorded signal (or directly proportional to the frequency of the recorded signal). It follows that for high speed recording at high data ate, close tape to head contact should be maintained in order to obtain good data resolution. A close tape to head contact may be obtained by increasing tape pressure on the head so as to overcome tape separation from the head due to the foil-bearing effect. Increasing the tape pressure, however, will increase wear of the tips and consequently shorten head life.

Instead of increasing the tape pressure on the head to overcome the lifting force on the tape, the tape facing head surface may be formed with a modified contour which will reduce the foil-bearing effect. This method is discussed by Abraham Eshel at pages 500 to 503 of FLUID FILM LUBRICATION edited by William A. Gross and published by John Wiley & Sons, Inc. in 1980.

The method includes forming a discontinuity in the curvature of the tape facing head surface at the point where the tape first comes into contact with the head as the tape moves across the head, such as at the point 19 in FIG. 1. Specifically, the contour includes a corner between upstream and adjacent downstream curved surface sections, as referenced to the direction of tape movement. The tape comes into contact with the downstream curved surface section starting at the corner such that the tape is at an angle to the upstream curved surface section at the corner of the curved surface sections. According to Eshel, the foil-bearing effect is reduced in the presence of such discontinuity in head surface curvature.

SUMMARY OF THE INVENTION

The present invention is directed to a method of forming magnetic heads having beveled surface contour designed for high speed recording at low tape to head pressure. The tape facing surface of the magnetic head is contoured by lapping a bevel surface at the tips of the magnetic head. At least one guide member is coupled to the body of the magnetic head to function as a guide to control the forming of the bevel surface contour during the lapping procedure. Rather than being removed after the head is formed, the guide member may be left attached to the body of the magnetic head to function as a tape support for preventing the tape from fluttering, which might otherwise cause rounding of the edges of the contour.

To improve wear resistance of the magnetic head, a strip of wear resistant material is disposed in close proximity to the magnetic pole tips and substantially flush with the pole tips at the surface of the head. The use of the wear resistant strip allows the body of the magnetic head to be made from a soft material which is less wear resistant but which can be easily machined in forming the head.

BRIEF DESCRIPTION OF THE DRAWINGS

The invention will be described with reference to the accompanying drawings wherein.

DESCRIPTION OF THE PREFERRED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

For purposes of example, and not by way of limitation, the present invention is described with reference to a magnetic head having more than one pair of magnetic pole tips for multi-track recording and playback. Each pair of pole tips interacts with one track of a magnetic tape.

Figure 1:
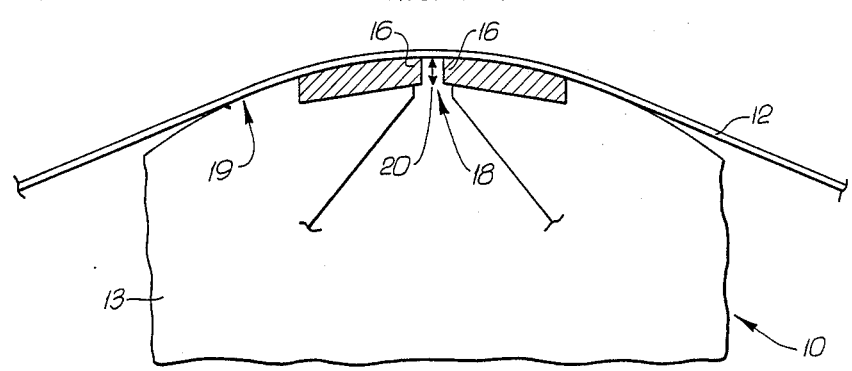
FIG. 1 is a cross-sectional view of a previously known magnetic head.
Figure 2:
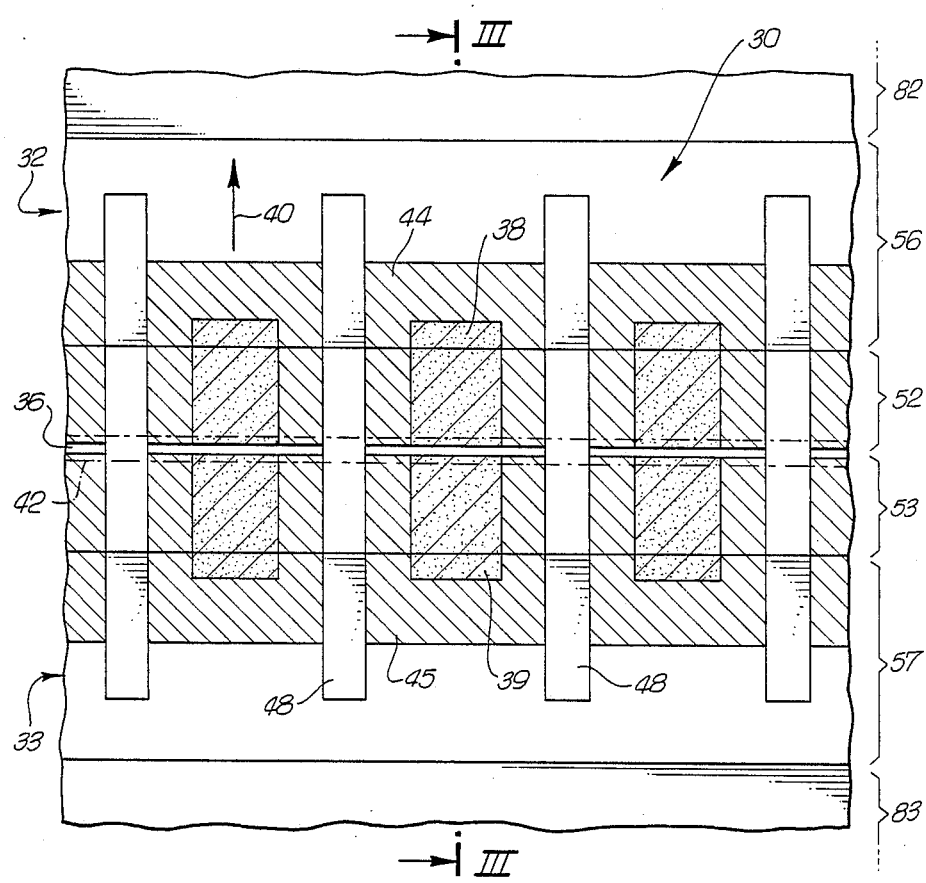
FIG. 2 is a plan view of the tape facing surface of a magnetic head formed according to the present invention.
Figure 3:
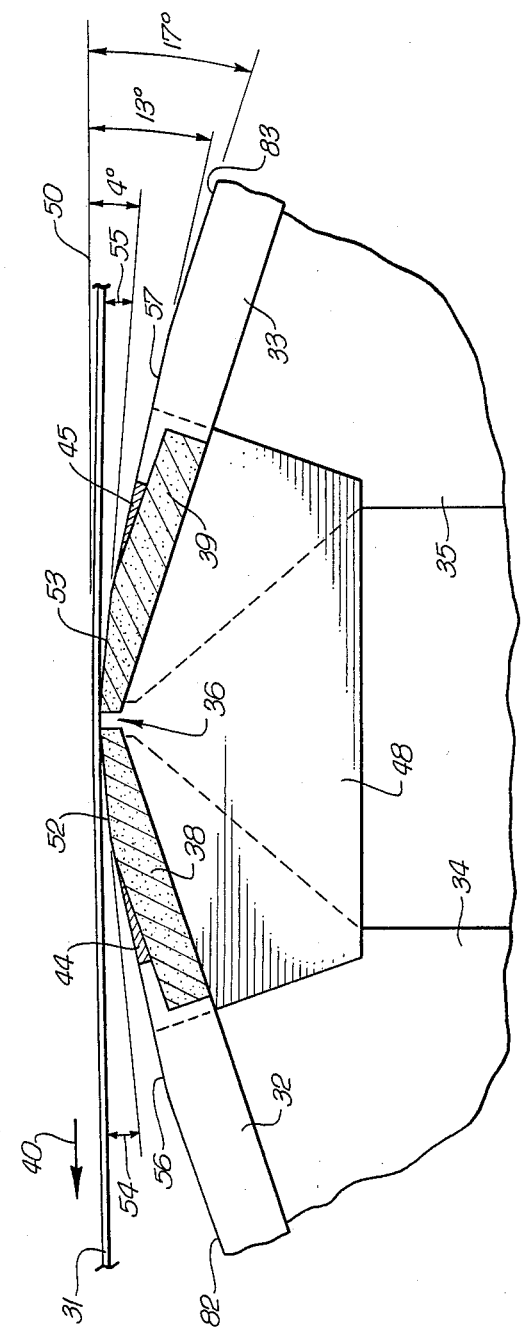
FIG. 3 is a sectional view along line III—III in FIG. 1.

Referring to FIGS. 2 and 3, the structure of surface 30 of a magnetic head facing tape 31 (FIG. 3) is shown. Specifically, two tip plates 32 and 33 are attached to brackets 34 and 35 (FIG. 3), respectively, on the body of the magnetic head. The tip plates 32 and 33 may be of aluminum or any non-magnetic material which can be easily machined. The tip plates 32 and 33 are positioned adjacent one another at an angle with a narrow gap 36 between the plates. The gap 36 is preferably filled with non-magnetic material such as silicon. Pole tips 38 and 39 of magnetic material such as ALFESIL (an aluminum, iron and silicon alloy) are set in the tip plates 32 and 33 at locations adjacent the gap 36. The exposed portions of the pole tips, are substantially flush with the surfaces of the tip plates 32 and 33. The locations of the pole tips correspond to the different tracks of the tape 31. Each pair of pole tips 38 and 39 interacts with a corresponding track as the magnetic tape 31 moves past the gap 36 in a direction (indicated by arrow 40) perpendicular to the air gap 36. The area of the tip plates 32 and 33 in contact with the tape is indicated by the dotted line 42.

To prolong head life, wear strips 44 and 45 of wear resistant material such as stainless steel are disposed on either side of the gap 36. Portions of the wear strips 44 and 45 are exposed at the head surface 30 and the exposed portions are substantially flush with the surfaces of the tip plates 32 and 33. The wear strips 44 and 45 provide support surfaces to the tape 31 which are less susceptible to tape abrasion, as compared to the aluminum surface of the tip plates. It takes longer to wear out both the pole tips and the adjacent stainless steel strips. The wear strip is preferably chosen to be of a material that wears slightly faster than the material of the pole tips 38 and 39 so as to allow the pole tips to protrude slightly above the exposed surface of the wear strips at the surface 30. In the example described herein, the wear resistance of stainless steel is slightly less than that of ALFESIL.

To avoid cross-talk between magnetic fields of adjacent pairs of pole tips, plates of magnetic shields 48, for example, of nickel alloy or ALFESIL, are placed transversely across the gap 36 at locations between adjacent pairs of pole tips as shown in FIG. 2. The magnetic shields 48 are substantially flush at the surface 30. In addition to magnetic shielding, the magnetic shields 48 provide a simple means of aligning and interconnecting the two tip plates together. Such function will become apparent after the discussion below of the method of forming the above-described structure.

Referring to FIG. 3, the cross-sectional contour of the tape facing surface 30 of the magnetic head is shown. The tip plates 32 and 33 are attached to the brackets 34 and 35 on the body of the magnetic head such that, in this particular example, each tip plate is at an angle 17° to a plane 50 which is perpendicular to the plane of symmetry of the head through the gap 36. The tip plates 32 and 33 have bevel surfaces 52 and 53, respectively, adjacent to the gap 36 and at a small angle such as 4° to the plane 50. In addition, the tip plates are beveled at surfaces 56 and 57 adjacent the surfaces 52 and 53, respectively, at an angle 13° to the plane 50.

In the case when the tape is moving in the direction 40, the tape 31 and the bevel surface 53 first come into contact at an angle 55 slightly less than 4°. This angle will be referred to as "entrance angle". It has been found that the foil-bearing effect can be reduced or eliminated by using a non-zero (non-tangent) entrance angle. Air which is entrained by the tape toward the head reverses direction at the entrance angle 55 thereby creating an air peeling effect at the entrance angle 55 which prevents the foil-bearing effect. In the case when the tape is moving in reverse direction to arrow 40, the tape makes an entrance angle 54 of approximately 4° to the beveled surface 52.

The method to form the above-described magnetic head will be described with reference to FIGS. 4A to F and FIGS. 5A to D. FIGS. 4A to F illustrate the steps of one method of constructing the tip plates 32 and 33 and FIGS. 5A to D illustrate the steps for forming the contour on the surface 30 of the head described above in connection with FIG. 3.

Figure 4A:
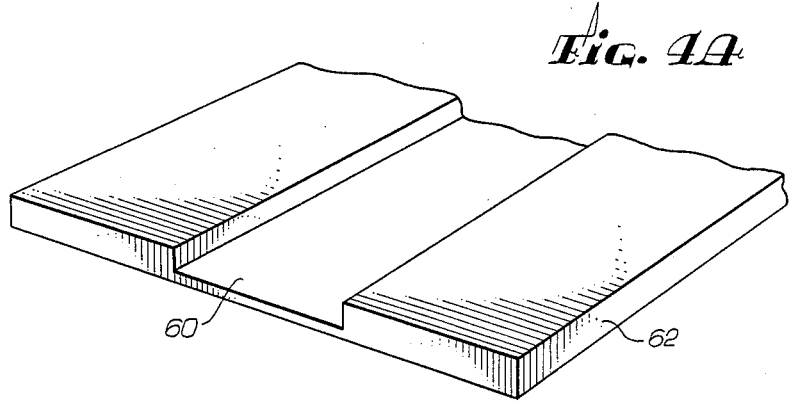
FIGS. 4A through 4F illustrate exemplary steps of a method for forming tip plates having pole tips.
Figure 4B:
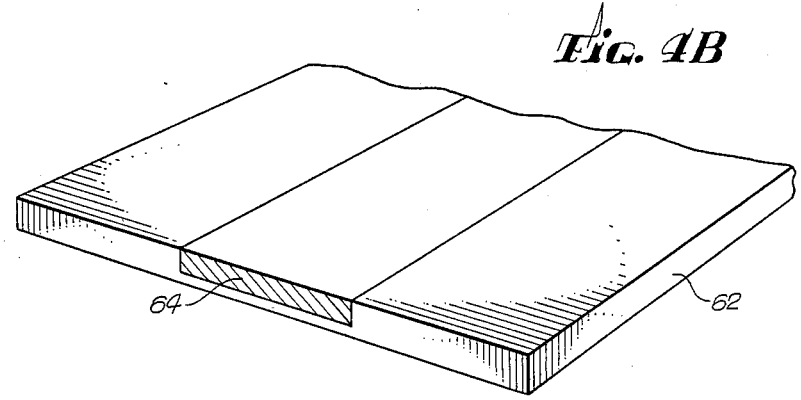

The tip plates 32 and 33 are constructed as follows. A channel 60 is cut along a median of a plate 62 of aluminum (FIG. 4A). A strip 64 of stainless steel is bonded to the plate 62 along the channel using epoxy (FIG. 4B). Depending on the thickness of the strip 64 used, it may be desirable to lap the strip 64 so that it is flush with the surface of the plate. The strip will later form the wear strips 44 and 45 shown in FIG. 3. The width of the strip 64 is chosen to be such that after the head is subsequently formed by the process described hereinafter, the exposed surface of the strips 44 and 45 shown in FIG. 3 is wider than the width of the contact area 42 of the tape 31 shown in FIG. 2.

Figure 4C:
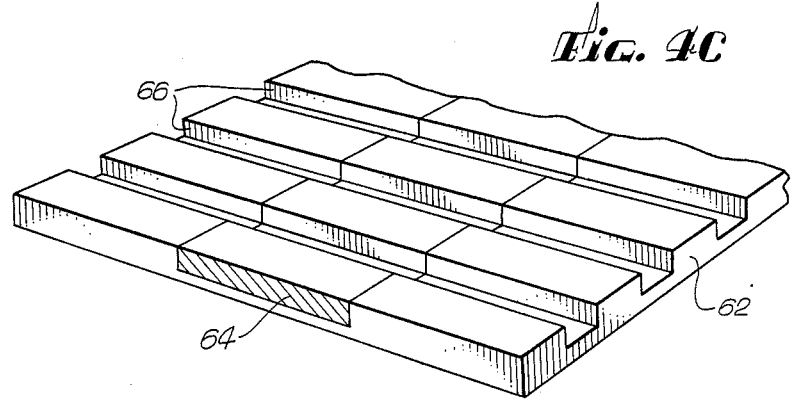
Figure 4D:
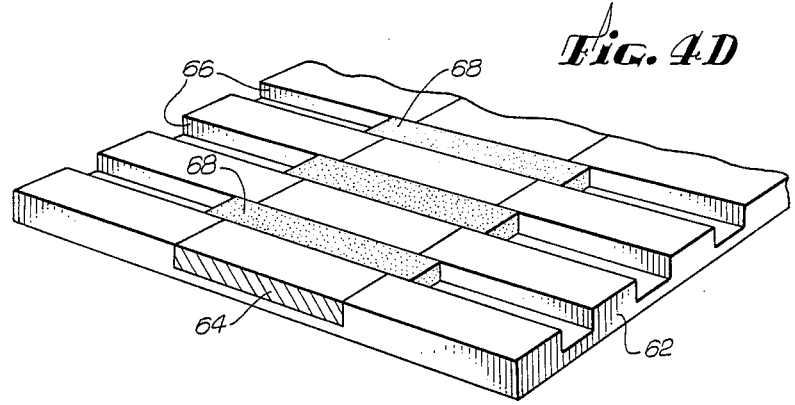

Referring to FIG. 4C, channels 66 are then cut on the plate 62 perpendicular to the strip 64 at spacing corresponding to the spacing between adjacent tape tracks. The width of each channel 66 corresponds to the width of the track. Pieces 68 of magnetic material such as ALFESIL are set preferably flush to the plate 62 along channels 66 (FIG. 4D). These pieces 68 will later form the magnetic pole tips 38 and 39 shown in FIG. 2. Preferably, the pieces 68 are lapped such that they are substantially flush with the surface of the plate 62 and the strip 64. The thickness of the pieces 68 is chosen to be such which will be sufficient to provide a desired gap depth after the magnetic head is finally formed by lapping.

Figure 4E:
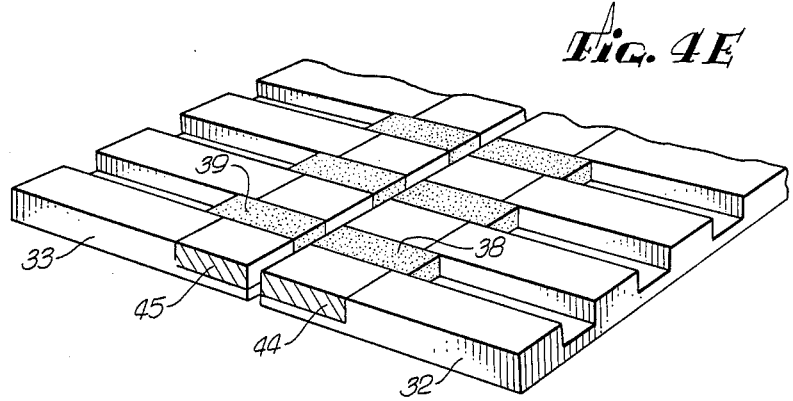
Figure 4F:
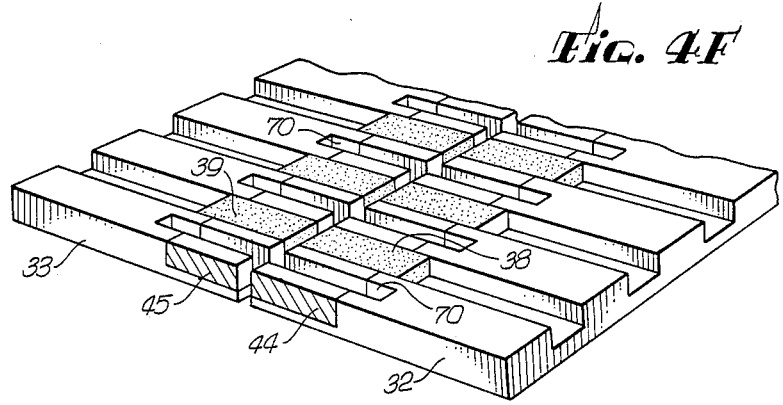

The structure in FIG. 4D is then sliced into two halves along the middle of the strip 64 (FIG. 4E). The two halves of the plate 62 form tip plates 32 and 33, and each piece 68 forms a pair of pole tips 38 and 39. The strip 64 forms wear strips 44 and 45 on tip plates 32 and 33, respectively. Slots 70 are then cut in each tip plate in a direction parallel to the pole tips 38 and 39 and in between adjacent pole tips on the respective tip plates 32 and 33, as shown in FIG. 4F. The slots 70 are for insertion of magnetic shields 48.

Figure 5A:
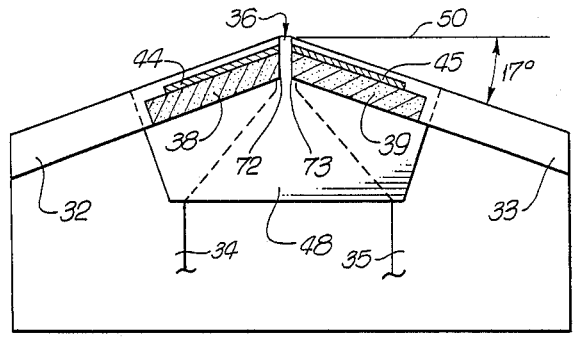
FIGS. 5A through 5D illustrate exemplary steps for forming the contour of the tape facing surface of the magnetic head according to a method of the present invention

The contour of the head surface 30 shown in FIG. 3 may be formed by the following steps illustrated in FIGS. 5A to D. The tip plates 32 and 33 shown in FIG. 4F are attached to brackets 34 and 35, respectively, on the body of the magnetic head such that the smooth underside of the tip plates in FIG. 4F faces away from the brackets (FIG. 5A). Edges 72 and 73 of the tip plates 32 and 33, respectively, are lapped to form the parallel gap 36 between the tip plates. A piece of silicon is sandwiched between the tip plates along the gap 36 (step not shown in FIG. 5A). Magnetic shields 48 are inserted into the slots 70 (shown in FIG. 4F) to interconnect the tip plates 32 and 33 and secured using epoxy.

Figure 5B:
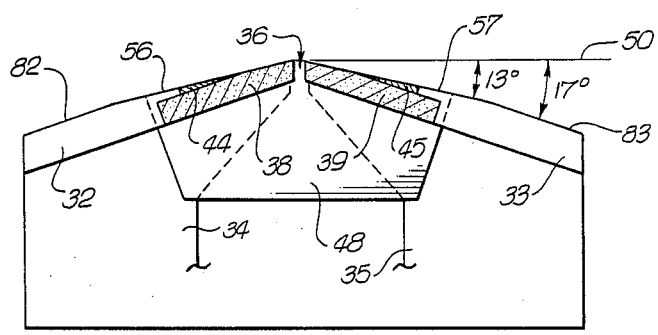

The next step is to remove material from the tip plates 32 and 33 to expose a portion of the wear strips 44 and 45 and of the pole tips 38 and 39 at the surface of the head (FIG. 5B). This is done by lapping 13° bevel surfaces 56 and 57 along the edges of the gap 36 until a predetermined gap depth is reached.

Figure 5C:
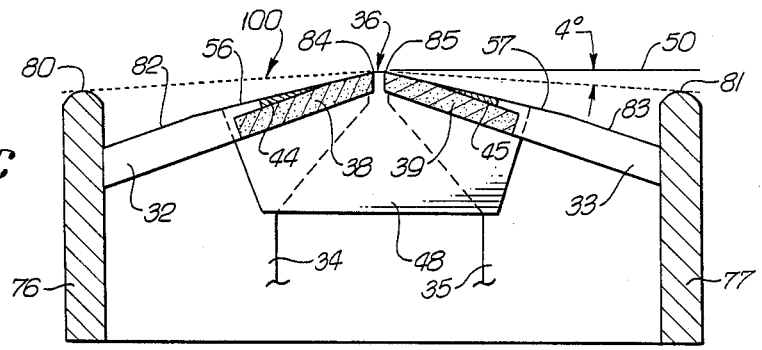
Figure 5D:
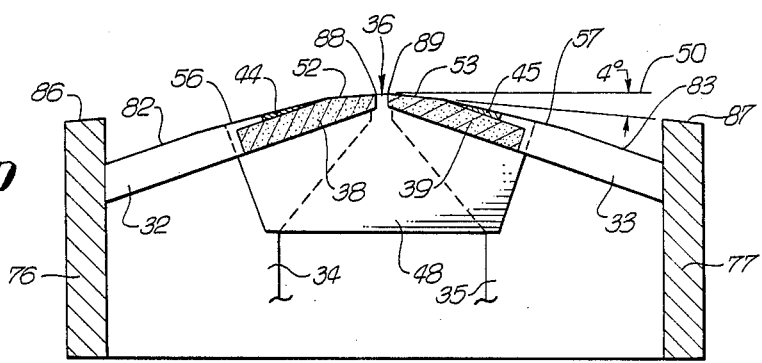

To assist in forming the 4° beveled surfaces 52 and 53 shown in FIG. 3, guide members 76 and 77 of approximately same hardness as the pole tips are coupled to the side of the body or the magnetic head as shown in FIG. 5C. The guide members may be mounted to the body using epoxy or a clamp. The guide members have a predetermined positional relationship with respect to the body. The edges 80 and 81 of the guide members 76 and 77 extend above the surfaces 82 and 83, respectively, of the adjacent tip plate by an amount such that the line from the edges 80 and 81 to edges 84 and 85, respectively, of the respective tip plates 32 and 33 makes a 4° angle to the plane 50. The assembly shown in FIG. 5C is inverted to rest the edge 80 and the edge 84 on a planar lapping surface represented by the dotted line 100 and both edges are lapped at the same time. The guide member 76 hence functions as a lapping guide in forming the precise angle of the bevel surface 52 along the edge 84 of the tip plate 32. The tip plate 33 is beveled at 4° angle using the guide member 77 in a similar manner to form bevel surface 53.

The edges 88 and 89 of the beveled surfaces 52 and 53 adjacent the gap 36 is lapped to form an initial tape contact surface on the head surface 30. This may be done by wrapping a diamond tape of 0.5 micron roughness over the edges 88 and 89 of the beveled surfaces and the edges 86 and 87 of the guide members and moving the tape back and forth across the magnetic head. The contact surface so formed conforms to the wrap angle which is made by a tape against the magnetic head in operation.

In summary, the present invention provides a method of forming a magnetic head having a surface contour designed for recording or reading data at high tape speed. With the addition of a wear strip, the head is more resistant to tape abrasion whereby tape life is prolonged.

It should be noted that the invention is not limited to the embodiment described above. Instead of using guide members that are attached to the side of the body of the magnetic head, the guide members may be in the form of ridges formed on the surfaces 82 and 83, respectively. Rather than being removed after the head is formed, the guide members 76 and 77 may be left attached to the body of the magnetic head. The guide members ensure that the tape will contact the head surface at the desired angle and prevent fluttering of the unsupported sections of the tape spanning from the pole tips to guide rollers (not shown) in the magnetic recording system. Tape fluttering is undesirable as the fluttering motion of the tape could round the contact point at the entrance angle to result in a 0° (tangent) entrance angle which would create foil-bearing effect. The guide members can also function as magnetic shields against external interference acting on the magnetic head if the guide members are of a magnetic material such as ALFESIL.

In addition, the wear strips 44 and 45 and/or magnetic shields 4 may be omitted from the structure of the magnetic head. The described method of forming the magnetic head can be modified to exclude the steps in connection with the wear strips and/or the magnetic shields.

While the invention has been described with respect to the preferred embodiment in accordance therewith, it will be apparent to those skilled in the art that various modifications and improvements may be made without departing from the scope and spirit of the invention. Accordingly, it is to be understood that the invention is not to be limited by the specific illustrated embodiment, but only by the scope of the appended claims.

What is claimed:

1. A method of forming a magnetic head comprising the steps of:
   providing a head having a body with a tape facing surface;
   coupling at least one guide member to the body of magnetic head wherein an edge of the guide member extends beyond the tape facing surface of the magnetic head and the guide member edge has a predetermined positioned relationship with respect to the tape facing surface; and
   simultaneously lapping the edge of the guide member and a portion of the tape facing surface of the magnetic head to form a predetermined beveled contour on the tape facing surface determined by said positional relationship.

2. A method as in claim 1 wherein the guide member is attached to the side of the body of the magnetic head adjacent the tape facing surface.

3. A method as in claim 1 further including the step of attaching magnetic pole tips to the body of the magnetic head at the tape facing surface wherein the lapping step includes pressing the pole tips and the edge of the guide member against the lapping surface so as to form a beveled contour at the pole tips.

4. A method as in claim 1 wherein the guide member is left attached to the body of the magnetic head after the magnetic head is formed.

5. A method of forming a contoured surface on the body of a magnetic head comprising the steps of:
   coupling at least one guide member to the body of the magnetic head such that an edge of the guide member extends from the surface to be contoured wherein the guide member edge has a predetermined positional relationship with respect to the surface to be contoured; and edge and
   simultaneously lapping the guide member edge and the surface to be contoured while using the edge of the guide to form a predetermined beveled contour on said surface determined by said positional relationship.

6. A method as in claim 5 wherein the guide member is left attached to the body of the magnetic head after the magnetic head is formed.

7. A method as claimed in claim 5 wherein the lapping step includes pressing the surface to be contoured and the edge of the guide member against a lapping surface so as to form a beveled contour.

8. A method as in claim 1 further comprising the step of providing wear resistant material on the tape facing surface of the magnetic head before the lapping step.

9. A method as in claim 3 further comprising the step of providing wear resistant material at the tape facing surface of the magnetic head in close proximity to the magnetic pole tips prior to the lapping step.

10. A method as in claim 7 further comprising the step of providing wear resistant material at the surface to be contoured in close proximity to the magnetic pole tips prior to the lapping step.

* * * * *